US012783745B2

(12) United States Patent
Han

(10) Patent No.: US 12,783,745 B2
(45) Date of Patent: Nov. 3, 2026

(54) METHOD FOR LAB-SCALE HYDRAULIC FRACTURE ANALYSIS

(71) Applicant: ARAMCO SERVICES COMPANY, Houston, TX (US)

(72) Inventor: Yanhui Han, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 961 days.

(21) Appl. No.: 18/156,293

(22) Filed: Jan. 18, 2023

(65) Prior Publication Data

US 2024/0241999 A1 Jul. 18, 2024

(51) Int. Cl.

| | |
|---|---|
| ***G06F 30/13*** | (2020.01) |
| ***E21B 43/26*** | (2006.01) |
| ***G01V 20/00*** | (2024.01) |
| ***G06F 111/10*** | (2020.01) |

(52) U.S. Cl.

CPC .............. *G06F 30/13* (2020.01); *E21B 43/26* (2013.01); *G01V 20/00* (2024.01); *E21B 2200/20* (2020.05); *G06F 2111/10* (2020.01)

(58) Field of Classification Search

CPC ...... G06F 30/13; G06F 2111/10; E21B 43/26; E21B 2200/20; G01V 20/00

USPC .......................................................... 703/10

See application file for complete search history.

(56) References Cited

U.S. PATENT DOCUMENTS

| | | | | |
|---|---|---|---|---|
| 11,255,184 B1 | 2/2022 | Xia et al. | | |
| 2020/0025667 A1* | 1/2020 | Allo | G01N 15/088 | |
| 2021/0080414 A1* | 3/2021 | Eichmann | G01Q 60/24 | |
| 2023/0184105 A1* | 6/2023 | Han | E21B 43/26 | 166/250.1 |

FOREIGN PATENT DOCUMENTS

| | | |
|---|---|---|
| CN | 109209350 A | 1/2019 |
| CN | 112211624 A | 1/2021 |

OTHER PUBLICATIONS

M. K. Hubbert et al., "Mechanics of Hydraulic Fracturing", Transactions of the AIME; vol. 210; 1957; pp. 153-168 (16 pages).

B. Haimson et al., "Initiation and Extension of Hydraulic Fractures in Rocks", Society of Petroleum Engineers Journal; 1967; vol. 7; No. 3; pp. 310-318 (9 pages).

(Continued)

*Primary Examiner* — Fawaad Haider

(74) *Attorney, Agent, or Firm* — Osha Bergman Watanabe & Burton LLP

(57) ABSTRACT

Examples of methods and systems for predicting a predicted breakdown pressure for a wellbore are disclosed. The methods include obtaining a set of wellbore length compensating breakdown pressure correction curves and obtaining an approximate breakdown pressure, wherein the approximate breakdown pressure is based, at least in part, on measurements taken in a laboratory-scale wellbore. The methods further include determining a predicted breakdown pressure from the approximate breakdown pressure and the set of wellbore length compensating breakdown pressure correction curves, where the predicted breakdown pressure predicts the breakdown pressure of a reservoir-scale wellbore.

7 Claims, 9 Drawing Sheets

(56) References Cited

OTHER PUBLICATIONS

Y. N. Abousleiman el al., "Poromechanics response of an inclined borehole subjected to in-situ stresses and finite length fluid discharge", J. Mech. Mater. Struct., 2010, vol. 5, No. 1 (22 pages).
S. L. Chen, "Three-dimensional analytical poromechanical solutions for an arbitrarily inclined borehole subjected to fluid injection", Proceedings of the Royal Society A: Mathematical, Physical and Engineering Sciences, 2019, vol. 475 (2221): 20180658 (22 pages).
S. Chen et al.; "Breakdown Overpressure in 3-D Poroelastic Inclined Borehole", IPTC-19803-Abstract; International Petroleum Technology Conference; Jan. 2020; pp. 1-10 (10 pages).
Y. Han et al.; "Engineering Charts for Predicting Breakdown Pressure for Finite-Length Wellbore Intervals", SPE-204907-MS; Society of Petroleum Engineers; Nov. 2021; pp. 1-13 (13 pages).

* cited by examiner

METHOD FOR LAB-SCALE HYDRAULIC FRACTURE ANALYSIS

BACKGROUND

Hydrocarbons are located in porous formations far beneath the surface of the earth. Wells are drilled into the porous formations to access and produce these hydrocarbons; however, some formations, such as those exhibiting extremely low permeability, may inhibit hydrocarbon migration and may not be economically feasible to produce. In such scenarios, hydraulic fracturing including multi-stage hydraulic fracturing operations may be performed on the well to create fractures within the reservoir formation in order to more efficiently produce the hydrocarbons.

Lab-scale hydraulic fracturing experiments have been conducted extensively to investigate the influence that formation properties and reservoir conditions have on the initiation, reactivation, and/or extension of fractures. A critical parameter in a fracturing operation is the formation breakdown pressure, which may be studied by these laboratory experiments. In laboratory experiment data processing, theoretical breakdown predictive models are used to analyze, diagnose, and optimize the formation fracturing process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relating to methods for predicting a predicted breakdown pressure for a wellbore are disclosed. The methods include obtaining a set of wellbore length compensating breakdown pressure correction curves and obtaining an approximate breakdown pressure, wherein the approximate breakdown pressure is based, at least in part, on measurements taken in a laboratory-scale wellbore. The methods further include determining a predicted breakdown pressure from the approximate breakdown pressure and the set of wellbore length compensating breakdown pressure correction curves, where the predicted breakdown pressure predicts the breakdown pressure of a reservoir-scale wellbore.

In general, in one aspect, embodiments relating to systems including a laboratory-scale wellbore analysis system configured to measure a plurality of observed rock parameters and observed wellbore parameters of a laboratory-scale wellbore within a rock sample, and a computer system. The computer system is configured to obtain a set of wellbore length compensating breakdown pressure correction curves, receive the plurality of observed rock parameters and observed wellbore parameters measurements taken in a laboratory-scale wellbore, determine an approximate breakdown pressure based, at least in part, on the plurality of observed rock parameters and observed wellbore parameters measurements taken in a laboratory-scale wellbore, and determine a predicted breakdown pressure from the approximate breakdown pressure and the set of wellbore length compensating breakdown pressure correction curves, where the predicted breakdown pressure predict the breakdown pressure of a reservoir-scale wellbore.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
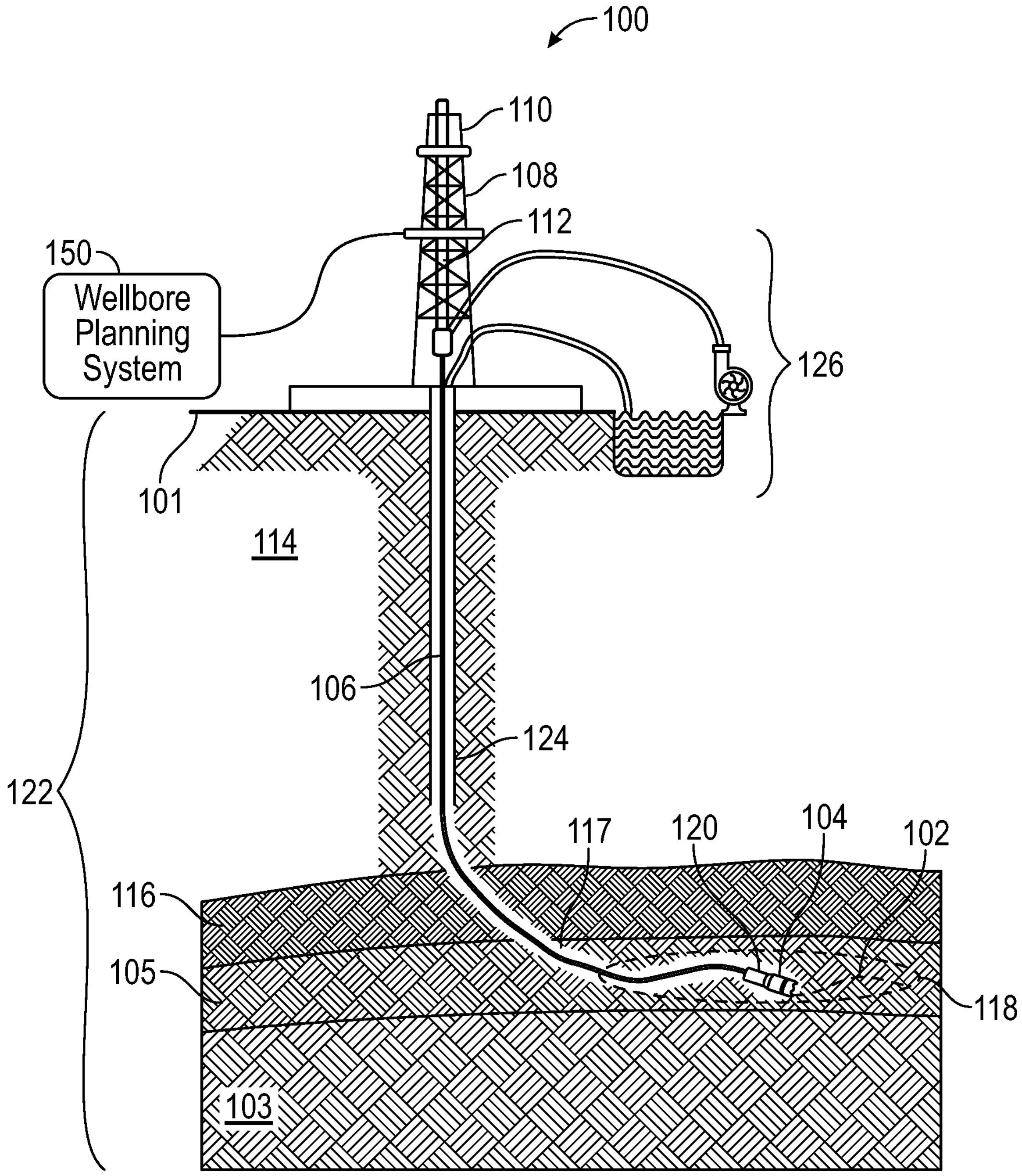
FIG. 1 illustrates a drilling system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms “a,” “an,” and “the” include plural referents unless the context clearly dictates otherwise. Thus, for example, reference to “a wellbore” includes reference to one or more of such wellbores.

Terms such as “approximately,” “substantially,” etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

The breakdown pressure, also known as formation fracturing pressure, is the pressure at which the rock matrix of an exposed formation fractures and allows fluid to be injected. It is a critical parameter in the optimization of hydraulic fracturing design, as hydraulic fracturing operations are typically conducted above the breakdown pressure. During a hydraulic fracturing operation, the reservoir is stimulated by injecting fluid into finite length wellbore intervals in order to create fractures in the formation. Various factors influence the formation breakdown pressure, including but not limited to in-situ stresses and pore pressure, formation permeability, rock strength, the rate of fluid injection, and the length and radius of the wellbore interval being pressurized. With many variables to consider, the industry still faces challenges to predict formation breakdown pressure with reasonable accuracy.

In current practices, the breakdown pressure is often predicted assuming infinite wellbore interval length, and an elastic reservoir formation with a time-independent mechanical response. However, it has been shown that wellbore geometry may influence the stresses and pressure distributions around the wellbore and therefore affects the breakdown pressure (S. Chen, Y. Abousleiman (2010) “Poromechanics response of an inclined wellbore subjected to in-situ stresses and finite length fluid discharge” *Journal of Mechanical of Materials and Structures* 5, 47-66, and S. Chen (2018) “Three-dimensional analytical poromechanical solutions for an arbitrarily inclined wellbore subjected to fluid injection” *Proceedings of the Royal Society A: Mathematical, Physical and Engineering Sciences,* 475(2221): 20180658). Such conventional breakdown pressure model may not include either the finite length of the borehole, nor the time-dependent poroelastic effects produced by fluid diffusion—rock deformation coupling. Thus, breakdown pressure predictions made without considering these effects may deviate significantly from actual field observations of breakdown pressure values, particularly for extended reach horizontal wells. Accurate breakdown pressure predictions are important, since incorrect breakdown pressure predictions can lead to costly and/or ineffective hydraulic fracturing operations.

Disclosed are embodiments that improve the prediction of the breakdown pressure for a reservoir-scale wellbore from measurements on a laboratory-scale wellbore, by applying a correction factor to currently used breakdown pressure models. Predicting the breakdown pressure for a reservoir-scale wellbore, without such a correction, is a routine step of well planning and hydraulic fracture planning. As such the disclosed embodiments represent an improvement over existing methods and processes for determining a breakdown pressure. The corrected breakdown pressure may be used to more accurately plan and further optimize hydraulic fracturing operations, which are often essential in producing low-permeability hydrocarbon reservoirs. As such the disclosed embodiments, are integrated into at least one tangible, practical and commercial valuable application.

The terms “borehole” and “wellbore” are often used synonymously, although the wellbore may refer to the drilled hole including the cased portion, whereas the borehole may not include the casing and may refer to the diameter of the open hole itself. However, throughout the present disclosure, the terms wellbore and borehole are used synonymously. The term “well” may be used to include more than the wellbore. In particular, the well may include completion and stimulation elements. For example, completion elements may include casing (metal tubes providing mechanical support and hydraulic isolation to the wellbore), a plurality of pumps and valves to assist and control fluid flow from the wellbore, and the perforation of casing to allow controlled fluid flow into the well. Stimulation elements may include hydraulic fractures emanating from the wellbore into the surrounding formation to increase the ease with which fluid may flow into the wellbore.

FIG. 1 illustrates a drilling system (100) in accordance with one or more embodiments. As shown in FIG. 1, a wellbore path (102) may be drilled by a drill bit (104) attached by a drillstring (106) to a drill rig located on the surface (101) of the earth. The drill rig may include framework, such as a derrick (108) to hold drilling machinery. The top drive (110) sits at the top of the derrick (108) and provides clockwise torque via the drive shaft (112) to the drillstring (106) in order to drill the wellbore. The wellbore path (102) may be a curved wellbore path, or a straight wellbore path. All or part of the wellbore path (102) may be vertical, and some wellbore paths may be deviated or have horizontal sections. The wellbore may traverse a plurality of overburden (114) layers and one or more cap-rock (116) layers to a hydrocarbon reservoir (105) within the subterranean region of interest (103).

The subterranean region of interest (103) may consist of layers of rock, separated by geological boundaries. Some rock layers may reside above the hydrocarbon reservoir (105) and may be referred to as “overburden rock,” or simply “overburden” (114). The hydrocarbon reservoir (105) may also be a source rock (i.e., the rock from which the hydrocarbon was released), or may be adjacent to the source rock. For example, an unconventional hydrocarbon reservoir (105) may be shale rock. Hereinafter, any rock within the subterranean region of interest (103) may be referred to as “in situ rock” or simply “rock.”

In situ rock at different locations within the subterranean region of interest (103) may experience differing states of stress. Stress is a physical quantity of measuring the force of one particle applied to another particle of a given material or object (e.g., rock), and is typically measured as the force per cross-sectional area. The stress state at a given location or point is characterized by various stress components, including normal stress or shear stress. As stress is a tensor, the force per unit area is associated with two directions, the direction of the applied force and the direction normal to the plane to which the force is applied. Normal stresses refer to the stress tensor components for which the two directions coincide and may be compressional or tensile, while shear stresses refer to stress tensor components where the two directions are normal to one another.

The stress state of in situ rock at each location may be caused, in part, by various geological phenomena, such as overburden (114) weight, tectonics, thermal processes, or glacial rebound. The stress state of rock may also be caused by anthropomorphic activities that affect the in situ rock, such as drilling a wellbore, well completion strategies, mining tunnels, or hydrocarbon or other fluid recovery. For example, in situ rock deep within the subterranean region of interest (103) may present a higher (vertical) stress state relative to in situ rock near the surface (101) due to overburden (114) pressure, i.e., pressure from overburden (114) weight. In another example, drilling a wellbore within the subterranean region of interest (103) may result in cracked or weakened in situ rock that relieves some of the stress present prior to drilling the well.

Prior to the commencement of drilling, a well construction plan may be generated. The well plan may include a wellbore plan, a completion plan, and a stimulation plan. The well construction plan may include each of these elements separately or may integrate each element into a single integrated well plan. For example, the wellbore plan may include specifications relating to the well trajectory, the density of drilling mud to be used, and the size of the drill bit and the resulting intended diameter ("caliper") of the wellbore. Similarly, the completion plan may include specifications of the diameter, wall thickness and material of the casing as well as the location and size of downhole or surface pumps. Further, the stimulation plan may specify the pumping schedule for pressurizing the wellbore until a breakdown pressure is reached and a proppant material and pumping schedule for injecting proppant (sand) into the hydraulic fracture resulting from the breakdown of the formation.

The wellbore plan may include a starting surface location of the wellbore, or a subsurface location within an existing wellbore, from which the wellbore may be drilled. Further, the wellbore plan may include a terminal location that may intersect with the target zone (118), e.g., a targeted hydrocarbon-bearing formation, and a planned wellbore path (102) from the starting location to the terminal location. In other words, the wellbore path (102) may intersect a previously located hydrocarbon reservoir (105).

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes.

The wellbore plan may include wellbore geometry information such as wellbore diameter and inclination angle. If casing (124) is used, the wellbore plan may include casing type or casing depths. Furthermore, the wellbore plan may consider other engineering constraints such as the maximum wellbore curvature ("dog-log") that the drillstring (106) may tolerate and the maximum torque and drag values that the drilling system (100) may tolerate.

A wellbore planning system (150) may be used to generate the wellbore plan. The wellbore planning system (150) may comprise one or more computer processors in communication with computer memory containing the geophysical and geomechanical models, information relating to drilling hazards, and the constraints imposed by the limitations of the drillstring (106) and the drilling system (100). The wellbore planning system (150) may further include dedicated software to determine the planned wellbore path (102) and associated drilling parameters, such as the planned wellbore diameter, the location of planned changes of the wellbore diameter, the planned depths at which casing (124) will be inserted to support the wellbore and to prevent formation fluids entering the wellbore, and the drilling mud weights (densities) and types that may be used during drilling the wellbore.

A wellbore (117) may be drilled using a drill rig that may be situated on a land drill site, an offshore platform, such as a jack-up rig, a semi-submersible, or a drill ship. The drill rig may be equipped with a hoisting system, such as a derrick (108), which can raise or lower the drillstring (106) and other tools required to drill the well. The drillstring (106) may include one or more drill pipes connected to form conduit and a bottom hole assembly (BHA) (120) disposed at the distal end of the drillstring (106). The BHA (120) may include a drill bit (104) to cut into subsurface (122) rock. The BHA (120) may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore (117). Both MWD and LWD measurements may be transmitted to the surface (101) using any suitable telemetry system, such as mud-pulse or wired-drill pipe, known in the art.

To start drilling, or "spudding in" the well, the hoisting system lowers the drillstring (106) suspended from the derrick (108) towards the planned surface location of the wellbore (117). An engine, such as a diesel engine, may be used to supply power to the top drive (110) to rotate the drillstring (106). The weight of the drillstring (106) combined with the rotational motion enables the drill bit (104) to bore the wellbore.

The near-surface is typically made up of loose or soft sediment or rock, so large diameter casing (124), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (101) of the earth.

Drilling may continue without any casing (124) once deeper, or more compact rock is reached. While drilling, a drilling mud system (126) may pump drilling mud from a mud tank on the surface (101) through the drill pipe. Drilling mud serves various purposes, including pressure equalization, removal of rock cuttings, or drill bit cooling and lubrication.

At planned depth intervals, drilling may be paused and the drillstring (106) withdrawn from the wellbore. Sections of casing (124) may be connected and inserted and cemented into the wellbore. Casing string may be cemented in place by pumping cement and mud, separated by a "cementing plug," from the surface (101) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (100) may be disposed at and communicate with other systems in the well environment. The drilling system (100) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (118) is reached, or the presence of hydrocarbons is established.

Figure 2:
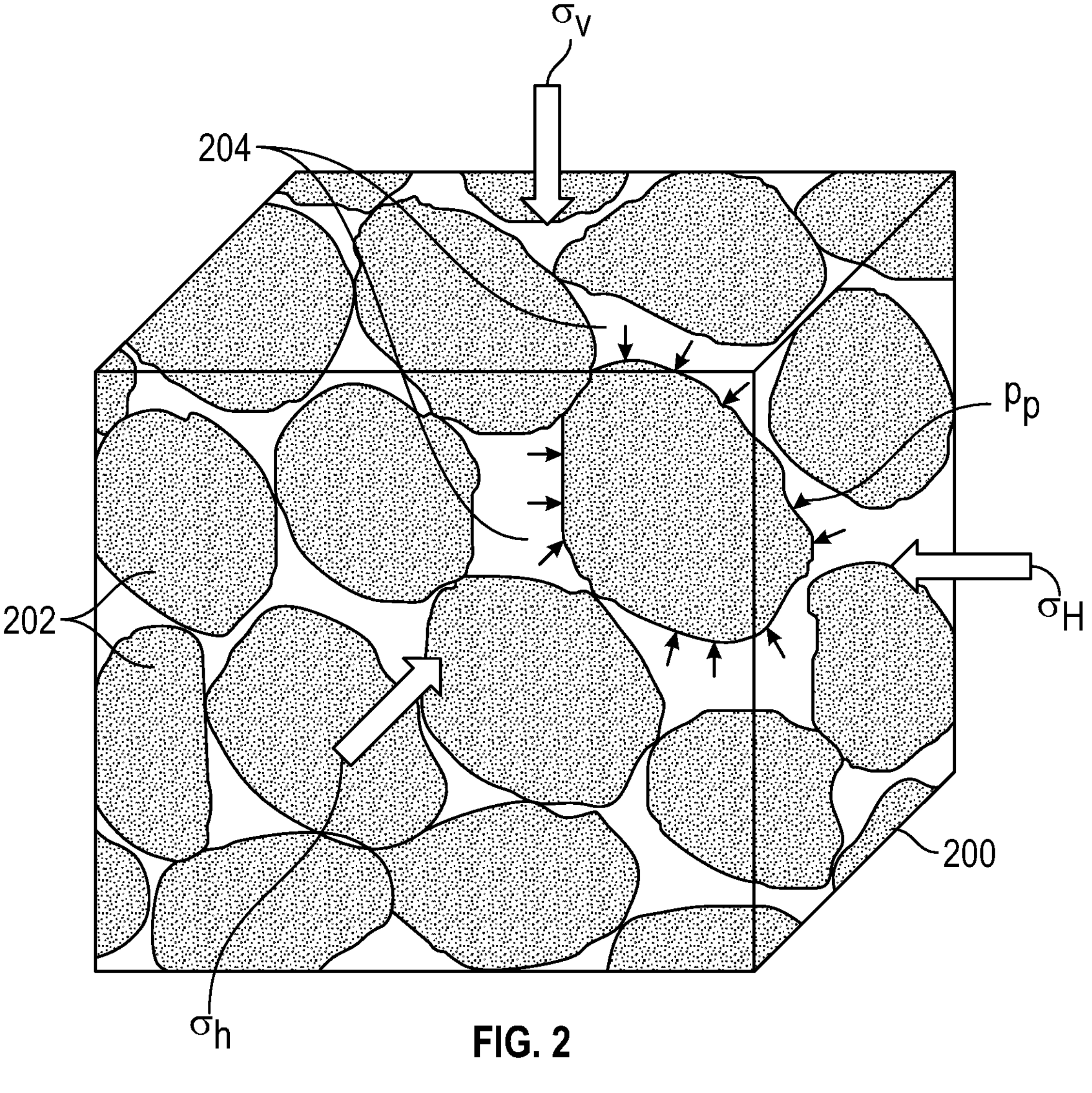
FIG. 2 illustrates a rock in accordance with one or more embodiments.

FIG. 2 illustrates a rock (200) in accordance with one or more embodiments. As shown in FIG. 2, the constituents of the rock (200) may include grains (202) and pores (204), where the pores (204) make up the void spaces between the grains (202). The grains (202) may be a material made up of, without limitation, quartz, calcite, volcanic material or kerogen. The pores (204) may be saturated with fluid, such as air, natural gas, oil, water, brine, or any mixture thereof. For example, the rock (200) of an unconventional hydrocarbon reservoir (105) may consist of shale grains (202) with hydrocarbon-saturated pores (204) and may be considered source rock.

The material of the grains (202) and the fluid saturating the pores (204) of the rock (200) may dictate the set of rock properties, which include the physical properties, mechanical behavior, or mechanical parameters of the rock (200). For example, physical properties may include porosity, permeability, or pore pressure. Porosity is defined as the fraction of the volume of the rock (200) that is occupied by the pores (204). Mathematically, porosity is the open space in a rock (200) divided by the total rock (200) volume. For example, unconventional hydrocarbon reservoirs (105) may have a low porosity, e.g., under 5%.

Permeability k is a measure of the ease of flow of a fluid through a porous rock (200), or in other words, it is a measure of the ability of a rock (200) to transmit fluids, typically measured in millidarcies (mD). The permeability of a rock (200) is related to its porosity, but also depends on the shapes of the pores (204) in the rock and their level of connectedness. That is, the degree of connection between the pores (204) and the viscosity of the fluid saturating the pores (204) may constrain permeability.

Permeability k may be determined in the lab by application of Darcy's law, which connects the gradient of pressure and flow velocity in rocks via their permeability. Permeability typically needs to be measured but may be estimated using empirically derived formulas.

Pore pressure ($p_p$) may be defined as the pressure that the fluids saturating the pores (204) apply to the grains (202) of the rock (200) and may also be related to the confining stress. Confining stress $\sigma_c$ is typically the stress caused by the weight of overburden (114) rock. Effective stress $\sigma_e$ may control the mechanical behavior of the rock (200) and may be represented by a function of the pore pressure $p_p$ and the confining stress acting on the rock (200). That is, in some embodiments, the effective stress $\sigma_e$ may be modeled as:

$$\sigma_e = \sigma_c - \alpha p_p, \quad \text{Equation (1)}$$

where α is Biot's coefficient of effective stress. The effective stress $\sigma_e$ may quantify the stress state of the rock (200), as the confining stress is supported partly by the grains (202) and partly by the fluid in pore space (202). However, one of ordinary skill in the art will appreciate that effective stress may be modeled differently than in Equation (1). The Biot coefficient α may be defined as the volume of fluid change induced by the change in bulk volume when the rock (200) is void of fluid and may be a value between zero and one.

The fluid-saturated pores (204) of rock (200) may present viscoelastic behavior, meaning that the fluid presents both viscous behavior and elastic behavior. Viscous behavior may be quantified by the viscosity of the fluid saturating the pores (204), where viscosity is a measure of the rate of resistance of the fluid to deform when a force is applied or removed.

Turning to the mechanical behavior of rock (200), the material of the grains (202) may present elastic behavior or plastic behavior depending on the magnitude of the applied force. The grains (202) may present elastic behavior when small forces are applied. In the elastic range, the grains (202) will return to their undeformed shape following the removal of a small force. The grains (202) may present plastic behavior when large forces are applied. In the plastic range, the grains (202) will partially maintain a deformed shape following the removal of a large force. However, in either the elastic or plastic range, the framework made up of the grains (202) may also consolidate or compact due to an applied force.

The tensile strength T of a rock (200) is the capacity of the rock (200) to resist forces applied in tension (e.g., a pulling force) per unit area without failure. The tensile strength of a rock (200) is commonly expressed in pounds per square inch (psi) or megapascals (MPa) and may be determined through laboratory rock mass strength experiments such as the Brazilian test or direct tensile test.

The mechanical behaviors of rock (200) may be quantified and modeled using various rock properties and their relationships. These rock properties may be used to predict the formation breakdown pressure as the breakdown pressure is closely related to in situ rock stresses.

An externally applied mechanical stress can elastically and reversibly alter the grains (202) of a rock (200), which is referred to as strain. Poisson's ratio v is an elastic property of a material, such as rock (200). Specifically, Poisson's ratio describes the proportional decrease/increase in a lateral measurement to the proportional increase/decrease in length in a sample of material that is elastically stretched/compressed.

The bulk compression modulus K, also referred to as the bulk modulus of elasticity, relates stress and compression, and may describe the ability of a rock to resist any change in its volume under compressional forces. That is, the bulk modulus may be defined as the radio of volumetric stress to volumetric strain.

Young's modulus E, also referred to as the modulus of longitudinal elasticity, describes the resistance of a material to stretching or compression during elastic deformation. The modulus of elasticity is a set of physical quantities that characterize the ability of any solid body to be elastically deformed under conditions where force is applied to it. That is, Young's modulus may be defined as the ratio of uniaxial tensile/compressive stress σh a rock (200) to the resulting extensional/compressional strain of the rock (200) and may be measured in gigapascals (GPa).

The shear modulus G, also referred to as the modulus of rigidity, may be characterize as the ability of a rock (200) to resist any change in its shape while maintaining its volume. G may be expressed by the ratio of shear stress to shear strain, defined as the alteration in the right angle between planes, whereon shear stresses are applied to two mutually orthogonal sites. Note that the relationship between Poisson's ratio v and Young's modulus E, bulk modulus K, and shear modulus G may be written as:

$$G = \frac{E}{2(1+v)}, \quad \text{Equation (2)}$$

and $$K = \frac{E}{3(1-2v)}. \quad \text{Equation (3)}$$

The stress state of the rock (200) may also affect its grains (202) and pores (204). The general state of stress at a point within a subterranean region of interest (103) may be characterized by independent shear and normal stress components, represented by a stress tensor. Further, the combination of the state of stress for every point in the subterranean region may be referred to as the stress field. For example, the in situ stress state may be the original stress status in the rock before excavations or other perturbations and may typically coincide with vertical and horizontal directions (components).

If the stresses acting on the rock (200) are normal or perpendicular to the rock (200), the stresses may be referred to as "principal stresses." The principal in situ stress tensor may consist of a vertical stress $\sigma_V$ (e.g., the overburden stress), and two horizontal or axial stresses, $\sigma_h$ and $\sigma_H$. For example, FIG. 2 shows principal stresses as one vertical stress $\sigma_V$ and two axial stresses, $\sigma_h$ and $\sigma_H$, acting on the rock (200)

Defining effective stress de using Equation (1) may be used to model an "isotropic" stress state of rock (200) as only one principal stress (i.e., confining stress $\sigma_c$) is considered; however, an "anisotropic" stress state of a rock may be modeled by considering multiple principal stresses (e.g., confining stress $\sigma_V$ and axial stress $\sigma_h$) when defining effective stress. An anisotropic stress state of in situ rock (200) may be mimicked in a laboratory setting, which may also allow for the determination of mechanical and hydraulic rock properties, such as permeability k or diffusivity.

Figure 3A:
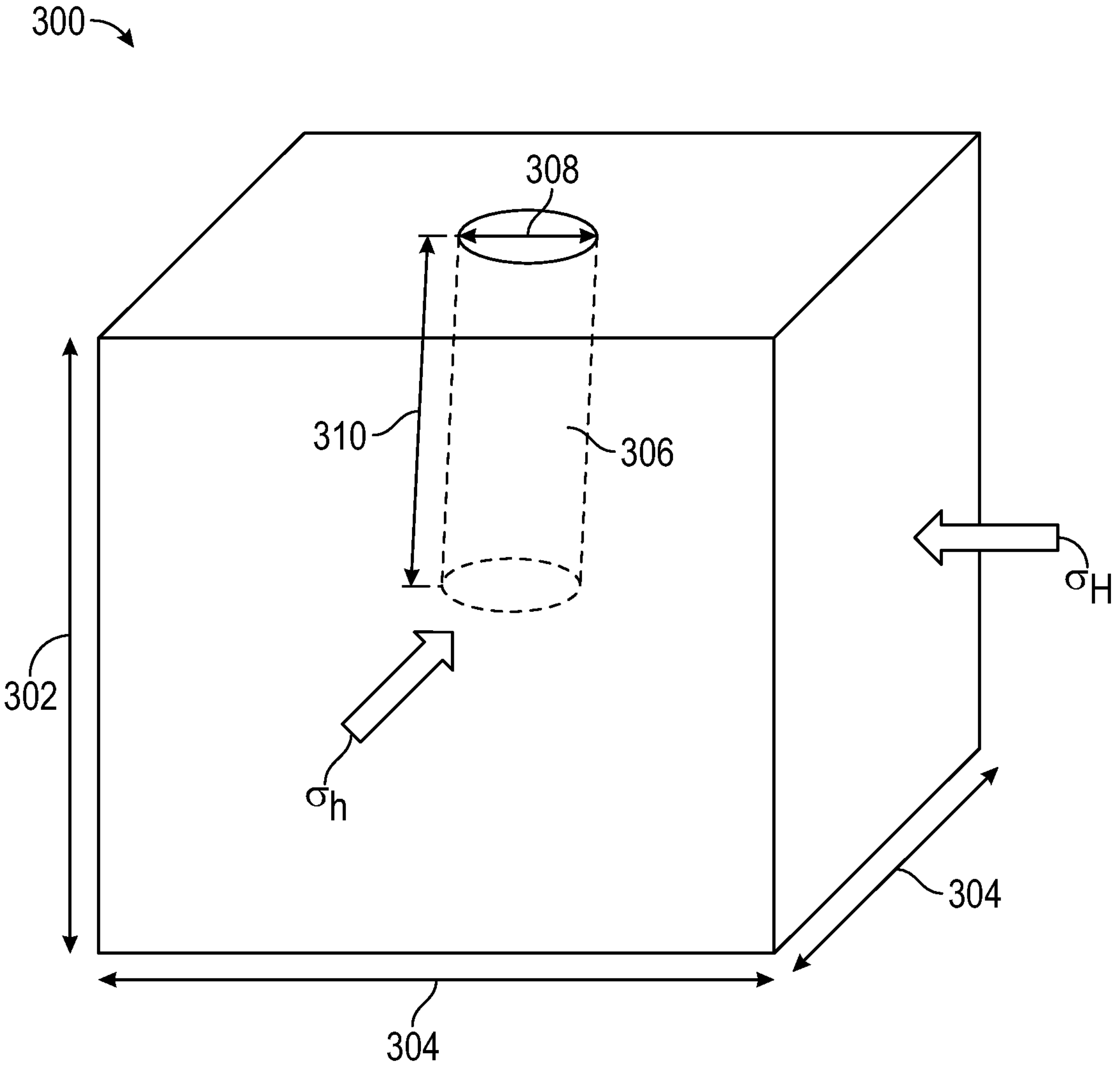
FIG. 3A depicts a rock sample in accordance with one or more embodiments.

FIG. 3A depicts a rock sample (300) in accordance with one or more embodiments. The rock sample (300) may be characterized by its block length L (302), and width W (304). A wellbore (306), typically drilled into the center of the rock sample (300) is shown with wellbore diameter 2R (308), and wellbore length h (310). In practice, the wellbore length h may translate to a "packed wellbore length" as defined by a fracturing operation, discussed later. The rock sample (300) may be loaded by major axial stress $\sigma_H$, and minor axial stress $\sigma_h$. Although a rectangular rock sample (300) is shown, in some embodiments, a cylindrical rock sample may be implemented.

Figure 3B:
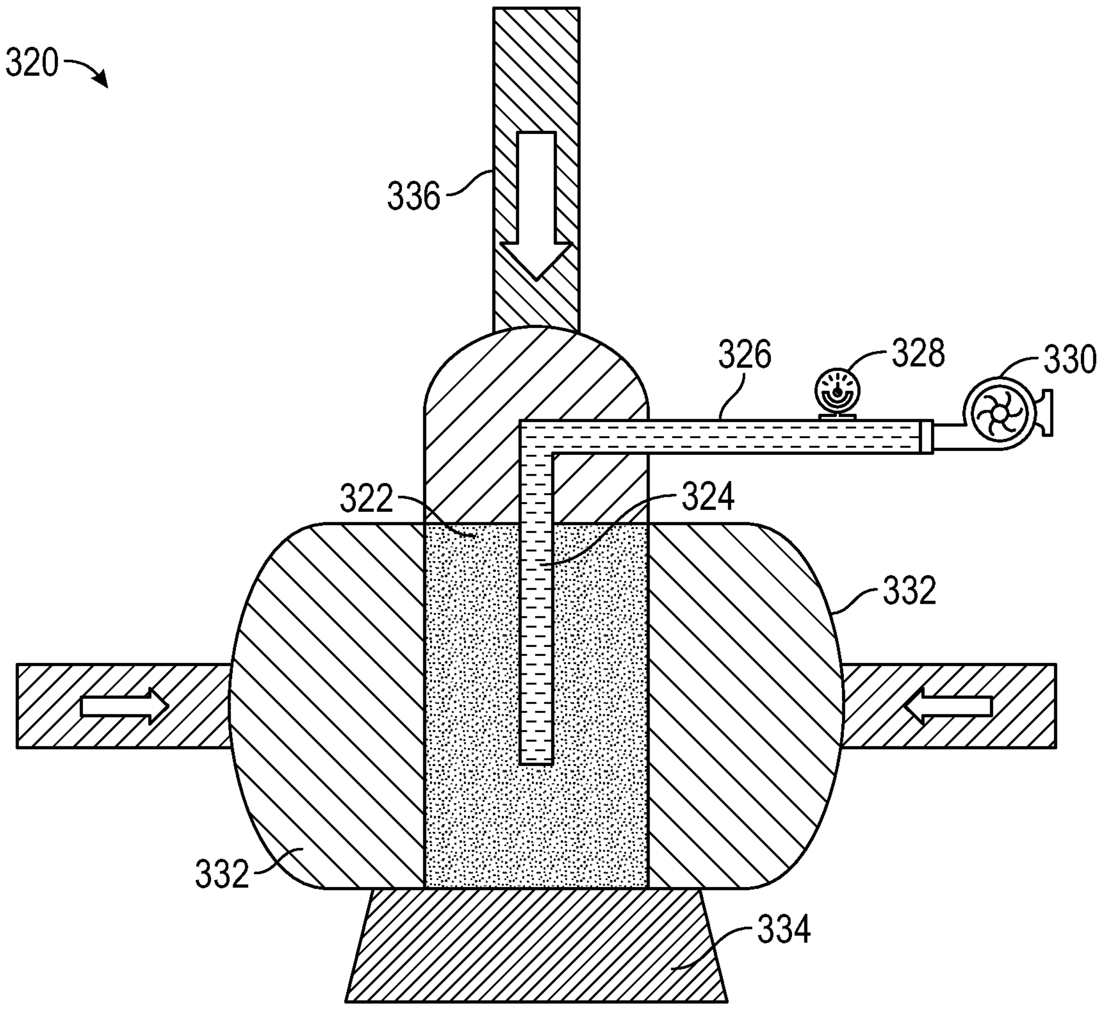
FIG. 3B shows a schematic laboratory-scale wellbore analysis system in accordance with one or more embodiments.

FIG. 3B depicts a schematic laboratory-scale wellbore analysis system (320), in accordance with one or more embodiments. FIG. 3B shows a rock sample (322) in which a laboratory-scale wellbore (324) has been drilled. The laboratory-scale wellbore (324) is connected via a fluid conduit (326) to a fluid pump (330) that is, in turn connected to a fluid reservoir (not shown). Fluid may be pumped from the fluid reservoir, using the fluid pump (330), into the laboratory-scale wellbore (324) to increase the pressure within the laboratory-scale wellbore (324). The pressure within the laboratory-scale wellbore (324) may be monitored by one or more fluid pressure sensors, such as fluid pressure sensor (328). The rock sample (322) is supported from below by a platform (334) and subject to a vertical stress $\sigma_V$ through the application of a vertically oriented press (336). Similarly, the rock sample (322) may be subject to horizontal constraining stresses, $\sigma_h$ and $\sigma_H$. In some embodiments the horizontal constraining stresses may be applied by presses, such as press (332). Although, FIG. 3B shows only a two-dimensional cross-section, with a horizontal constraining stress applied along only one axis, a person of ordinary skill in the art will appreciate that horizontal constraining stresses may be applied by presses acting along two or more axes, or may be applied using a pressurized fluid bath without departing from the scope of the invention.

Using a rock sample (300) such as the one described in FIG. 3A, the breakdown pressure $P_b$ may be predicted using the method proposed by Hubbert and Willis (M. K. Hubbert, D. G. Willis (1957) "Mechanics of hydraulic fracturing" *Transactions of the AIME,* 210(01), pp. 153-168). Hubbert and Willis (H-W) developed the first realistic model relating recorded hydraulic fracturing test variables to the in situ state of stress in rock. This is the known as the Hubbert-Willis (H-W) model. In the elastic model, at the wellbore wall, the tangential stress at the two points aligned perpendicular to the minimum horizontal stress, $\sigma_h$, will be the first to meet this criterion as the fluid pressure is raised. A hydraulic fracture will then initiate and extend in the direction of the maximum horizontal stress, $\sigma_H$.

Using these assumptions, Hubbert and Willis were able to obtain an elastic solution relating the hydraulic fracturing initiation pressure (breakdown pressure) and the two principal horizontal stresses, $\sigma_h$, and $\sigma_H$. That is, assuming zero $p_p$ in the rock sample (300), the H-W breakdown pressure model predicts that the breakdown pressure $$P_b^{H-W}$$

for an impermeable wellbore is determined by the stresses $\sigma_h$ and $\sigma_H$, and rock tensile strength T is represented as:

$$P_b^{H-W} = 3\sigma_h - \sigma_H + T. \quad \text{Equation (4)}$$

Note that in some cases, T may not be incorporated in the H-W model. Hubbert and Willis remark that at great depths below the subsurface, T may be negligible due to preexisting fissures traversing the rock. Considering that most rocks are essentially permeable, Hudson and Fairhurst developed a poroelastic model that also incorporated fluid penetration into the formation (B. Haimson, C. Fairhurst (1967) "Initiation and extension of hydraulic fractures in rocks" *Society of Petroleum Engineers Journal,* 7(03), pp. 310-318).

Haimson and Fairhurst (H-F) noted that the radial outward flow of the injected fluid into the rock pores modifies the stress field around the wellbore. Invoking poroelastic theory to incorporate the effect of the injection fluid permeation on the stress distribution around the wellbore, Haimson and Fairhurst obtained the following hydraulic fracturing criterion for a permeable wellbore:

$$P_b^{H-F} = \frac{3\sigma_h - \sigma_H + T}{2 - \alpha\frac{1-2\nu}{1-\nu}}, \quad \text{Equation (5)}$$

where v is Poisson's ratio and a is Biot's coefficient of effective stress. In comparison to the H-W model for impermeable wellbores in Equation (4), the H-F breakdown pressure model may predict a lower breakdown pressure for the permeable wellbore.

Although all rocks are porous media, and so any wellbore drilled into a rock may be simplified as being permeable, in practice this may not be the case. For example, if the time it takes for a fluid to diffuse over a few times the wellbore radius is much larger than the related operation time (e.g., the time to undergo a hydraulic fracturing operation), the wellbore may be considered impermeable.

The time scale of the process of diffusion in a porous medium may be characterized by the diffusion coefficient c. A diffusion coefficient is the amount of a particular substance that diffuses across a unit area of a medium over time, typically measured in $cm^2/s$. That is, the diffusion coefficient c for a given fluid (or gas) diffusing through a rock may be dependent on both the rock type and fluid type. In general, the rate of diffusion into a porous medium is a lot less than in an empty space due to restrictions imposed by the pore geometry. The diffusivity coefficient c relates to the mobility coefficient κ and the storativity S, and may be defined as:

$$c = \frac{\kappa}{S}, \quad \text{Equation (6)}$$

where κ may be measured in meters squared per pascal second ($m^2$/pa·s) and relates to permeability k (measured in mD) linearly as $\kappa = k \times 9.9 \times 10^{-13}$, and storativity S is given by:

$$S = \frac{(1-\nu_u)(1-2\nu)}{M(1-\nu)(1-2\nu_u)}. \quad \text{Equation (7)}$$

The storativity of a porous medium (e.g., source rock) may indicate the amount of fluid that will be released from the source rock when there is a unit drop in reservoir pressure and may be measured in $PSI^{-1}$. In Equation (7), $v_u$ is the undrained Poisson's ratio and M is Biot's modulus given by:

$$M = \frac{2G(\nu_u - \nu)}{\alpha^2(1-2\nu_u)(1-2\nu)} \quad \text{Equation (8)}$$

In order to plan for a hydraulic fracturing operation, fluid injection rates and times must be determined since during a hydraulic fracturing operation, fluid is typically injected into the wellbore at a particular rate for a particular interval of time. The rates of injection and injection times are used to produce the required pressure levels within the wellbore and the injection parameters may be tested and determined through lab experiments. In lab hydraulic fracturing experiments, typically fluid is injected into a wellbore (306) drilled into a rock sample (300) following a ramp-up injection curve.

Figure 4:
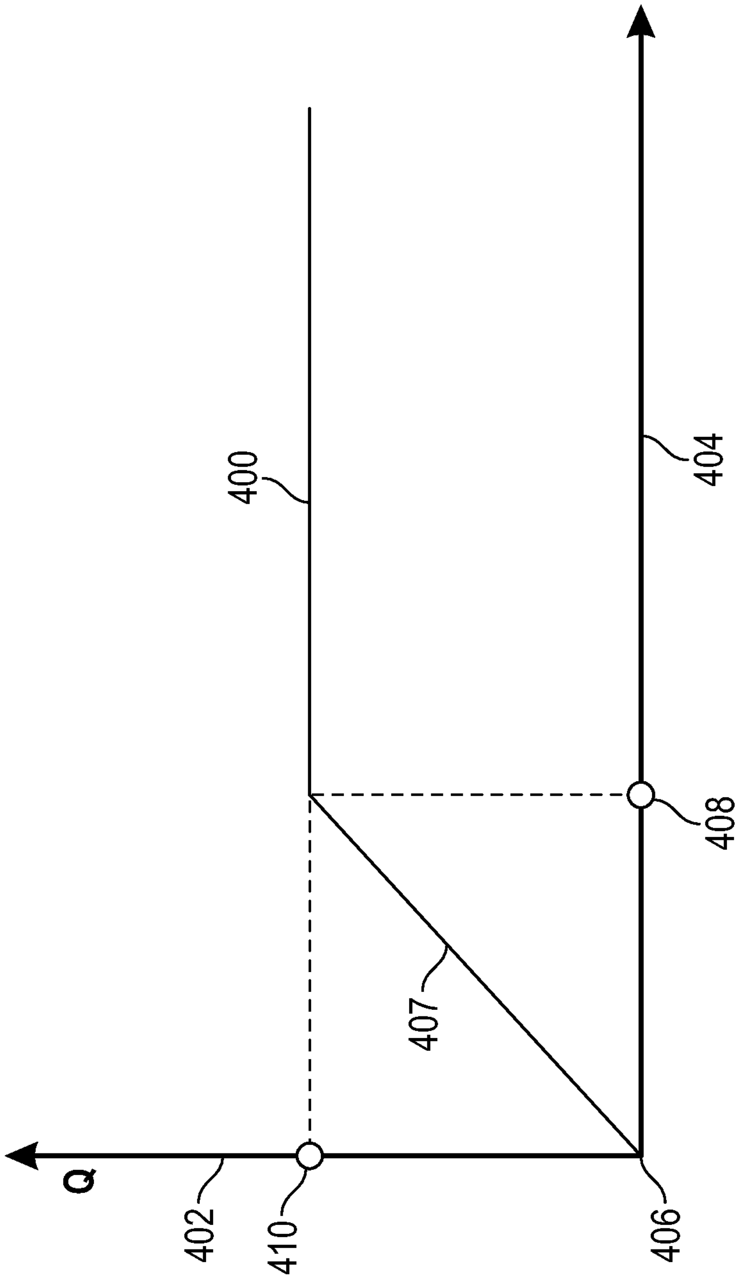
FIG. 4 shows a ramp-up injection curve in accordance with one or more embodiments.

FIG. 4 shows a ramp-up injection curve (400) in accordance with one or more embodiments. The injection curve (400) initiates where the injection rate Q (denoted by the vertical axis (402)), and injection time (denoted by the horizontal axis (404)) are both zero (406). The injection rate Q may vary with time and/or be constant. In practice, the wellbore may be divided into intervals and each interval may be fractured separately, using a pumping scheme determined by a set of injection parameters. The set of injection parameters may include an injection rise-up time $t_0$ (408), and a target injection rate $Q_0$ (410). For example, if the injection curve (400) is a "ramp style" curve, the injection rate may increase linearly with time (407) until the target injection rate is reached after which the injection may be constant after the injection rise-time $t_0$ (408).

As seen in FIG. 4, the injection curve (400) may be adjusted by changing the rise-up time $t_0$ (408) and the target injection rate $Q_0$ (410). When modeling the effect of the injection rate in a particular wellbore, the wellbore injection discharge rate $q_0$ may be determined, based on the target injection rate $Q_0$ and the surface area of the wellbore (typically cylindrical), by:

$$q_0 = \frac{Q_0}{2\pi Rh}. \quad \text{Equation (9)}$$

The time-dependent stress and pore pressure solutions for a finite-length wellbore subject to a ramp-up type injection curve (400) were developed by Chen (Chen et al. (2020) "Breakdown Overpressure in 3-D Poroelastic Inclined Borehole" *International Petroleum Technology Conference*) and Han (Han et al. "Engineering Charts for Predicting Breakdown Pressure for Finite-Length Wellbore Intervals" *SPE Middle East Oil & Gas Show and Conference*). The solutions showed that the stress properties and the pore pressure of the rock are affected by both the wellbore length h, and the injection rise-up time $t_0$. Thus, these parameters are important to the accurate prediction of breakdown pressure.

Normalized values of h and to may be used to generalize determine ng a more accurate breakdown pressure (i.e., a breakdown pressure corrected for a finite wellbore length). A correction factor may be selected based on these normalized values in order to correct an initial estimate of breakdown pressure, such as a breakdown pressure estimated using the H-W model described in Equation (4).

Figure 5A:
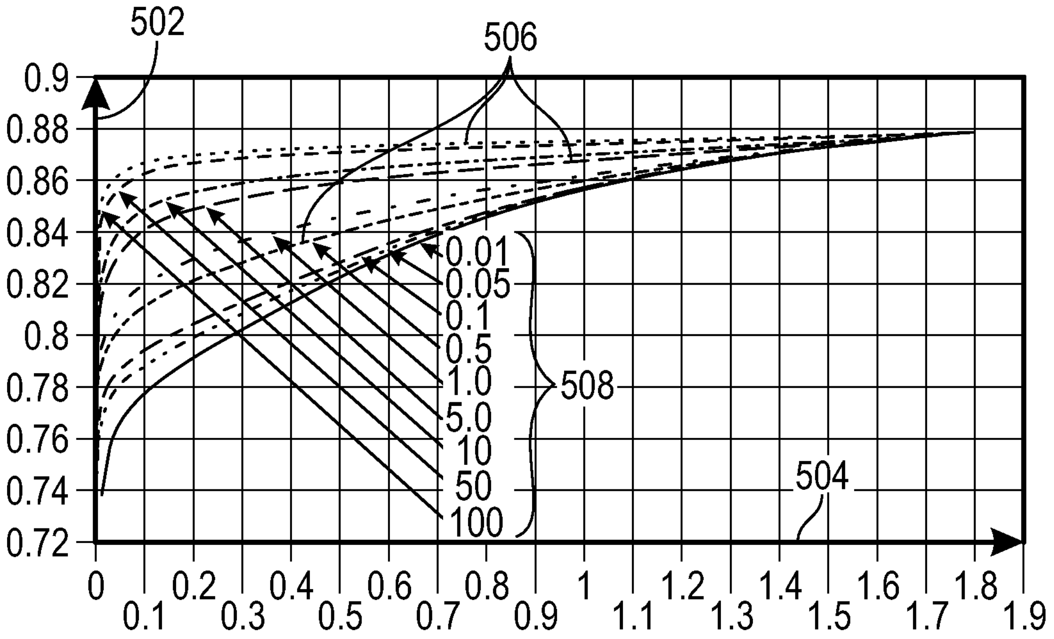
FIGS. 5A and 5B show correction factor charts in accordance with one or more embodiments.
Figure 5B:
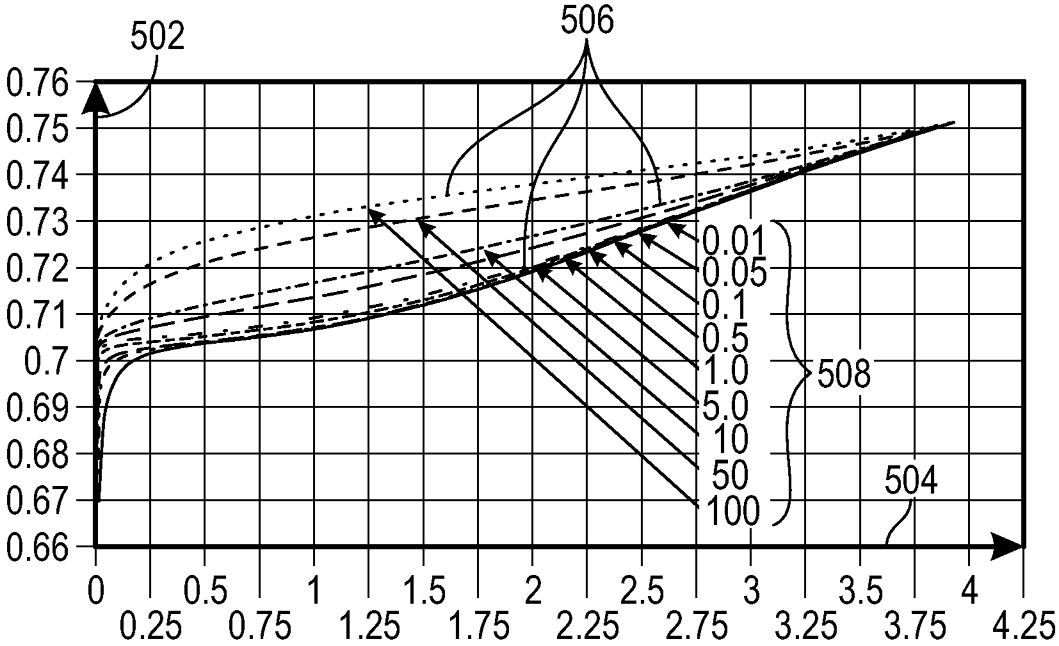

FIGS. 5A and 5B show correction factor charts in accordance with one or more embodiments. The correction factor charts in FIGS. 5A and 5B relate normalized wellbore length h*, normalized breakdown pressure $$P_b^*,$$

and normalized injection rise-up time $$t_0^*.$$

These values are normalized in order to generalize the correction factor values as follows:

$$P_b^* = \frac{P_b k}{q_0 R}, \quad \text{Equation (10)}$$

$$h^* = \frac{h}{2R}, \quad \text{Equation (11)}$$

and $$t_0^* = \frac{ct_0}{R^2}. \quad \text{Equation (12)}$$

In each of FIGS. 5A and 5B, the vertical axes (502) denote increasing correction factor values, while the horizontal axes (504) denote increasing values of normalized breakdown pressure $$P_b^*.$$

FIGS. 5A and 5B show correction factor charts for normalized wellbore lengths of 2 and 10, respectively. Each correction factor curve (506) may be generated for different values of $$t_0^*$$

(508). That is, h* determines which correction factor chart is to be used, the value of $$t_0^*$$

(508) determines which correction curve (506) to refer to, and $$P_b^*$$

is used to select the appropriate correction factor along said correction curve (506). The selected correction factor may then be used to correct the initial estimate of the breakdown pressure, $P_b$. That is, a corrected breakdown pressure may be determined by multiplying the correction factor with $P_b$. Note that interpolation applies to values of h*, but if the values of $$t_0^* \text{ and } P_b^*$$

are outside of the plotted correction curves (506), then extrapolation may only be considered with caution.

Figure 6:
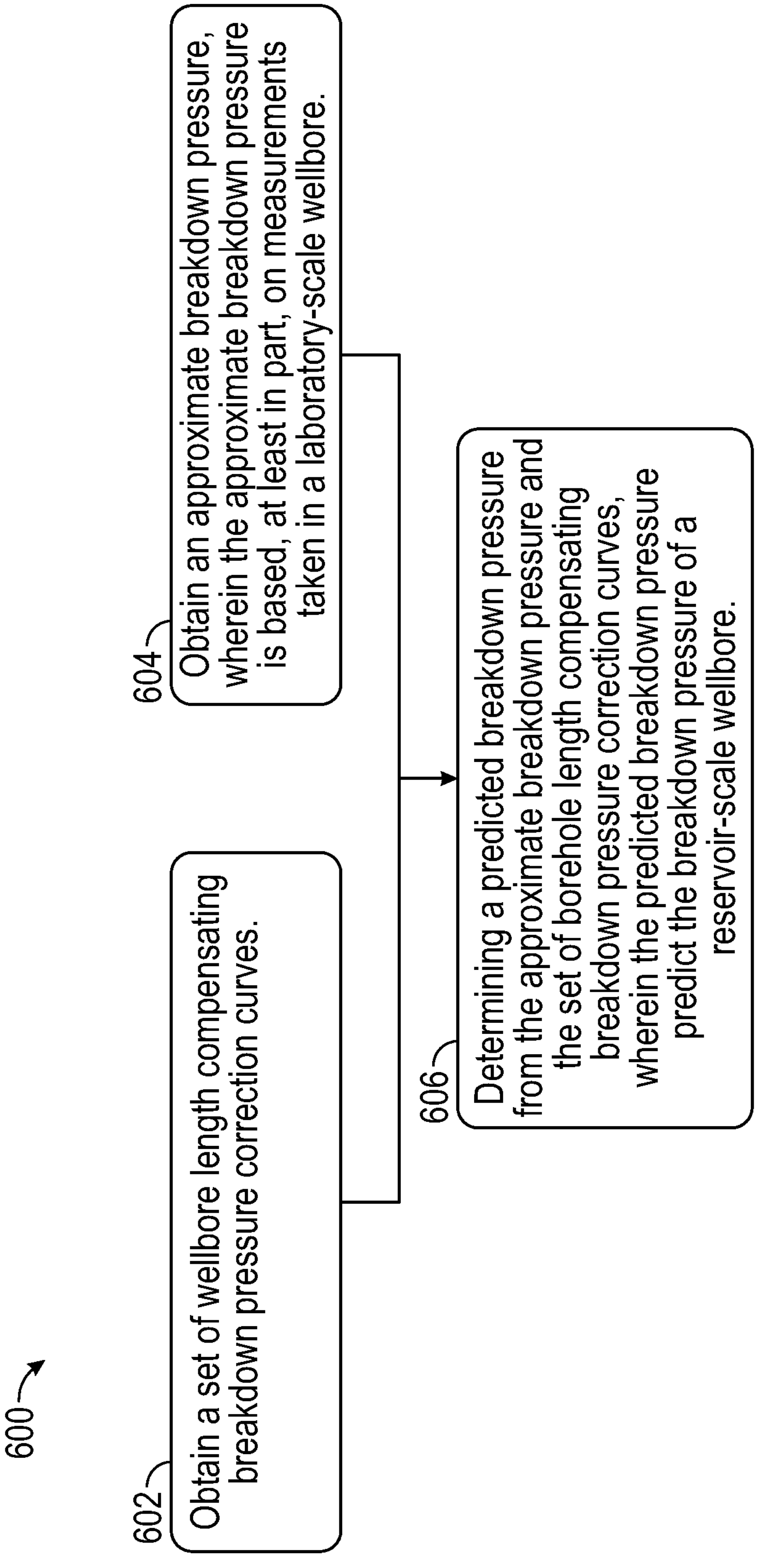
FIG. 6 shows a flowchart in accordance with one or more embodiments.

FIG. 6 shows a flowchart (600) in accordance with one or more embodiments. In Step 602 a set of wellbore length compensating breakdown pressure correction curves may be obtained. In some embodiments, the set of wellbore length compensating breakdown pressure correction curves may be determined using numerical simulation for a plurality of nominal rock parameters and nominal wellbore parameters. These nominal parameters may span the range of expected rock parameters and expected wellbore parameters and the values of each parameter may vary by equal intervals across the range. The set of nominal wellbore parameters may include a wellbore length h and a wellbore radius R. The set of nominal rock parameters may include tensile strength T, permeability k, storativity S, Poisson's ratios $v_u$ or v, Biot's modulus M, shear modulus G, Biot's coefficient of effective stress $\alpha$, Young's modulus E, bulk compression modulus K, or stress conditions such as confining stresses or shear stresses (e.g., $\sigma_V$, $\sigma_h$, $\sigma_H$). For example, the numerical simulation used to determine the set of wellbore length compensating breakdown pressure correction curves may include numerical solutions to a system of poroelastic equations. the set of wellbore length compensating breakdown pressure correction curves may be generated from hundreds of simulations, e.g., for different injection wellbore interval length; the correction factor curves may then be generalized using parameter normalization techniques. In other embodiments, the set of wellbore length compensating breakdown pressure correction curves may be obtained by performing a series of laboratory-scale experiments. For example, a separate laboratory-sale experiment may be performed for each sample point within the range of expected rock parameters and expected wellbore parameters. The laboratory experiment may inject a wellbore drilled into a rock sample with various fluids using a set of injection parameters in order to measure a breakdown pressure. The observed laboratory-scale breakdown pressure may then be related to the breakdown pressure predicted by theoretical models or observed in reservoir-scale wellbores drilled in formations from which the rock sample was taken. In accordance with one or more embodiments, the set of wellbore length compensating breakdown pressure correction curves may include a wellbore length compensated normalized breakdown pressure correction curve for each of a plurality of doublets consisting of a normalized wellbore length and a normalized injection rise-up time. The normalization may be performed using factors dependent on the formation permeability, borehole radius, diffusion coefficient and normalized injection rate as shown in equations (9)-(12).

In step 604, an approximate breakdown pressure may be determined for a reservoir-scale wellbore in accordance with one or more embodiments. The approximate breakdown pressure may be based, at least in part, on measurements taken in a laboratory-scale wellbore. The measurements may include a plurality of observed rock parameters and observed wellbore parameters. For example, the wellbore parameters may include the length and radius (or diameter) of the laboratory-scale wellbore as well as injection parameters that may include an injection rise-up time $t_0$ and a target injection rate $Q_0$. Further, a wellbore discharge rate $q_0$ may be determined using Equation (9) and the geometric wellbore parameters h and R from step 602. The observed rock parameters may include tensile strength, permeability, storativity, Poisson's ratios, Biot's modulus, shear modulus, Biot's coefficient of effective stress, Young's modulus, bulk compression modulus, or stress conditions such as confining stresses or shear stresses (e.g., $\sigma_V$, $\sigma_h$, $\sigma_H$).

The approximate breakdown pressure may be predicting using a breakdown pressure prediction model and the plurality of observed rock parameters and observed wellbore parameters. In some embodiments, the breakdown pressure prediction model may be a Hubbert-Willis model, such as the model in Equation (4).

In step 606, a predicted breakdown pressure from the approximate breakdown pressure and the set of borehole length compensating breakdown pressure correction curves. The predicted breakdown pressure predicts the breakdown pressure of a reservoir-scale wellbore. Determining the predicted breakdown pressure may further require interpolating between points in the set of borehole length compensating breakdown pressure correction curves.

In order to demonstrate the method described in flowchart (600), two examples are provided. Note that these examples are included for clarity and are not intended to limit the present disclosure. In the provided examples, a breakdown pressure is calculated for a rock sample (300), having block length (302) L=15 cm and width (304) W=15 cm, with a wellbore (306) drilled into the center of it, analogous to what is shown in FIG. 3A. First, a set of parameters are obtained (which, in practice may be a set of well parameters for a drilled wellbore), including the following set of rock properties:

$$v = 0.219$$

$$v_u = 0.447$$

$$\alpha = 0.968$$

$$T = 5 \text{ MPa}$$

$$E = 1.854 \text{ GPa}$$

$$\kappa = 100 \text{ nD}$$

$$\mu = 1 \text{ cP}$$

$$\sigma_H = 25 \text{ MPa}$$

$$\sigma_h = 20 \text{ MPa}$$

where μ is the fluid viscosity, measured in centipoise (cP), and mobility coefficient κ is given in nanodarcies (nD). The set of parameters also includes a set of geometric parameters (which, in practice may be a set of geometric wellbore parameters). In the first example, h=2 centimeters (cm) and R=0.5 cm.

Using Equation (2) and the rock properties provided above, shear modulus G may be computed to be 760 MPa. Employing equations (8), (7), and then (6) may determine Biot's modulus M, storativity S, and diffusivity coefficient c, respectively. In this example, $c=1.65\times10^{-7}$ square meters per second ($m^2/s$).

Next, a set of injection parameters are defined for the rock sample (which, in practice may be the drilled wellbore), with the injection rise-up time $t_0$=20 s, and a target injection rate $Q_0$=0.1 milliliters per minute (ml/min). Using Equation (9) and the given set of geometric parameters, the wellbore injection discharge rate $q_0$ may be determined as $q_0=2.65\times10^{-6}$ m/s.

In this example, the initial breakdown pressure is estimated using the H-W breakdown pressure model, given by Equation (4). Using the values from the given set of rock properties, the initial breakdown pressure $$P_b^{H-W}$$

may be determined as 40 MPa.

A normalized wellbore length h* may be determined using Equation (11), and thus in this example, h*=2. That is, the correction factor chart in FIG. 5A may be referenced for this example. To determine a correction factor curve (506), a normalized injection rise-up time $$t_0^*$$

must be determined, using Equation (12). Here, $$t_0^* = 0.132$$

and therefore an interpolation may be required between two correction factor curves (506) in FIG. 5A, particularly the correction factor curves (506) defined for $$t_0^* = 0.1 \text{ and } t_0^* = 0.5.$$

The normalized breakdown pressure is given by Equation (10), and for this example $$P_b^{H-W*} = 0.3.$$

The correction factor may be selected via interpolation between the two correction factor curves (506) FIG. 5A using the normalized breakdown pressure. In this example, the correction factor is approximately 0.82. Multiplying the correction factor with the initial breakdown pressure may yield the corrected breakdown pressure, 32.8 MPa.

In a second example, the set of injection parameters and the set of rock properties remain the same, but the set of geometric parameters is adjusted to reflect a longer wellbore of length h=10 cm, with wellbore radius R=0.5 cm. The diffusion coefficient is not affected by wellbore length and is therefore the same as the previous example ($c=1.65\times10^{-7}$ $m^2/s$); however, the wellbore injection discharge rate $q_0$, based on Equation (9), depends on the set of geometric parameters. That is, in this second example, $q_0=5.31\times10^{-7}$ m/s.

Again, the initial breakdown pressure is estimated using the H-W breakdown pressure model, given by Equation (4). As the set of rock properties does not change from the first example, the initial breakdown pressure $$P_b^{H-W}$$

remains at 40 MPa.

A normalized wellbore length h* may be determined using Equation (11), and thus in this second example, h*=10. That is, the correction factor chart in FIG. 5B may be referenced. The normalized injection rise-up time is the same as the first example, $$t_0^* = 0.132$$

and therefore an interpolation may once again be required between two correction factor curves (506) in FIG. 5B. The normalized breakdown pressure is given by Equation (10), and for this second example $$P_b^{H-W*} = 1.51.$$

The correction factor selected via interpolation between the two correction factor curves (506) FIG. 5B using the normalized breakdown pressure is approximately 0.71. Multiplying the correction factor with the initial breakdown pressure may yield the corrected breakdown pressure for this second example, 30.7 MPa. The two examples shown demonstrate the effect of changing the wellbore length h on the corrected breakdown pressure using the methods described in the present disclosure.

Returning to the flowchart (600) in FIG. 6, in step 614, a fracturing operation may be performed on the drilled wellbore based on the corrected breakdown pressure from step 612, in accordance with one or more embodiments. The hydraulic fracturing plan may use the corrected breakdown pressure directly, or indirectly, by using formation or rock properties of the subterranean region of interest (103). For example, the in situ stress profile and permeability profiles may be quantified in the zone to be stimulated, including the layers of rock above and below this zone as they may influence fracture height growth.

A hydraulic fracture propagation model may be run to determine the fluid types and injection parameters required to first fracture the formation around the wellbore and then to achieve the optimum values of propped fracture length and fracture conductivity. Some variables used in fracture modeling may be uncertain. For example, the values of in situ stress, Young's modulus, permeability, fluid-loss coefficients, and therefore breakdown pressure are often not known with certainty and must be estimated. An accurately predicted breakdown pressure is critical in determining a pumping schedule, which may include injection parameters and fluid properties, such as injection rates, fluid temperature, fluid type, or proppant information. Once a hydraulic fracture operation is planned, the required resources and supplies, such as sand, water, chemicals, or pump trucks are transported to the fracturing site.

Figure 7:
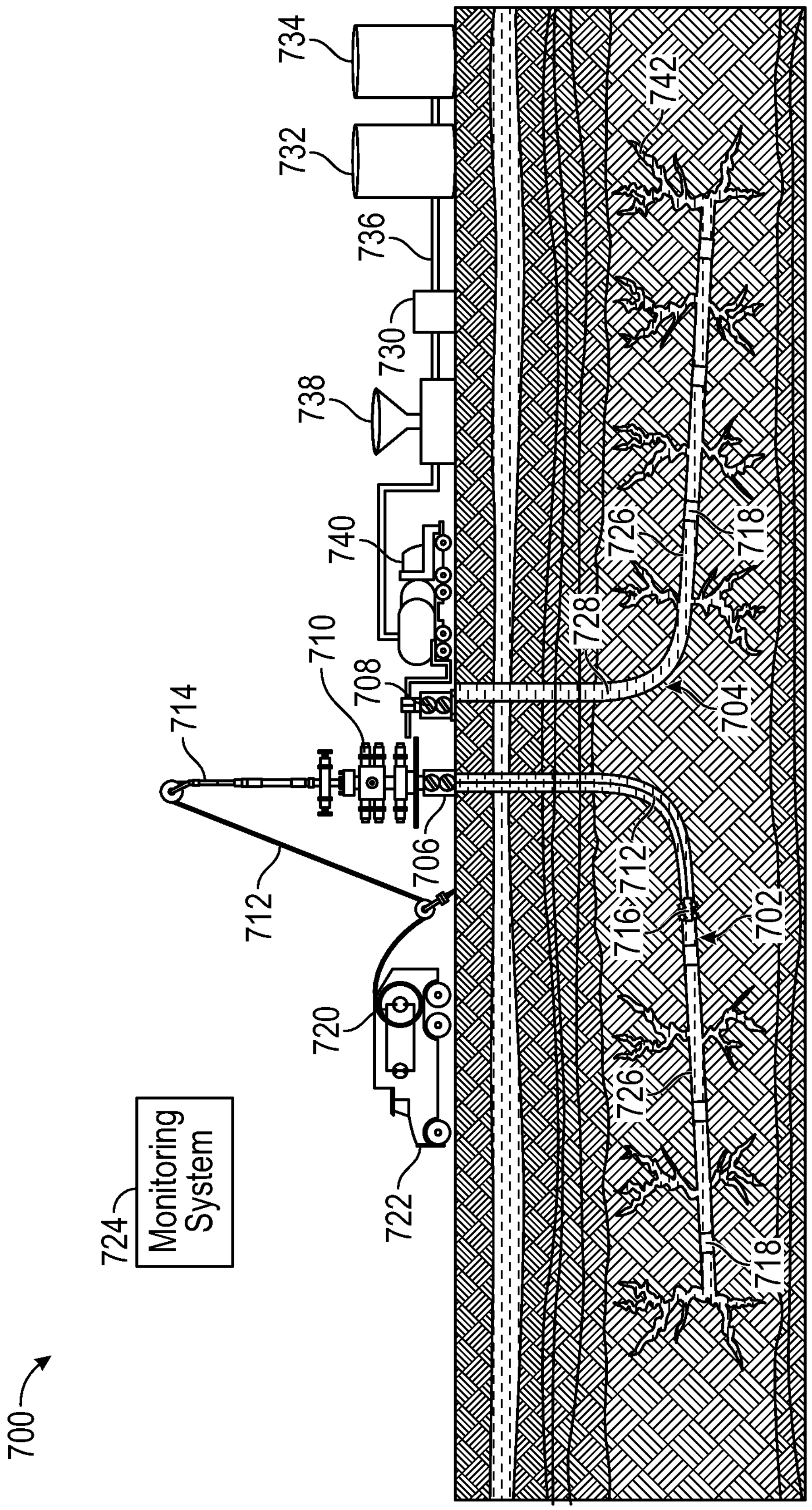
FIG. 7 shows a hydraulic fracturing system conducting a fracturing operation in accordance with one or more embodiments.

FIG. 7 shows a hydraulic fracturing system (700) conducting a fracturing operation in accordance with one or more embodiments. The particular hydraulic fracturing operation and hydraulic fracturing system (700) shown is for illustration purposes only. The scope of this disclosure is intended to encompass any type of hydraulic fracturing system (700) and hydraulic fracturing operation. In general, a hydraulic fracturing operation includes two separate operations: a perforation operation and a pumping operation.

In further embodiments, a hydraulic fracturing operation is performed by separating the wellbore into multiple packed wellbore lengths and fracturing each interval in "stages." Further, the hydraulic fracturing operation may be performed on multiple wells that are geographically grouped. A single well may have anywhere from one to more than forty stages. Typically, each stage includes one perforation operation and one pumping operation. While one operation is occurring on one well, a second operation may be performed on the other well. As such, FIG. 7 shows a hydraulic fracturing operation occurring on a first well (702) and a second well (704). The first well (702) is undergoing the perforation operation and the second well (704) is undergoing the pumping operation.

The first well (702) and the second well (704) are horizontal wells meaning that each well includes a vertical section and a lateral section. The lateral section is a section of the well that is drilled at least eighty degrees from vertical. The first well (702) is capped by a first frac tree (706) and the second well (704) is capped by a second frac tree (708). Those skilled in the art will appreciate that the use of the term "frac" refers to "fracturing," and the term "frac" is used herein to describe elements that may be used in a fracturing operation. A frac tree (706, 708) is similar to a Christmas/production tree but is specifically installed for the hydraulic fracturing operation. The frac trees (706, 708) tend to have larger bores and higher-pressure ratings than a Christmas/production tree would have. Further, hydraulic fracturing operations require abrasive materials being pumped into the well at high pressures, so the frac tree (706, 708) is designed to handle a higher rate of erosion.

In accordance with one or more embodiments, the first well (702) and the second well (704) each require four stages. Both the first well (702) and the second well (704) have undergone three stages and are undergoing the fourth stage. The second well (704) has already undergone the fourth stage perforation operation and is currently undergoing the fourth stage pumping operation. The first well (702) is undergoing the fourth stage perforating operation and has yet to undergo the fourth stage pumping operation.

In accordance with one or more embodiments, the perforating operation includes installing a wireline blow out preventor (BOP) (710) onto the first frac tree (706). A wireline BOP (710) is similar to a drilling BOP; however, a wireline BOP (710) has seals designed to close around (or shear) wireline (712) rather than drill pipe. A lubricator (714) is connected to the opposite end of the wireline BOP (710). A lubricator (714) is a long, high-pressure pipe used to equalize between downhole pressure and atmosphere pressure in order to run downhole tools, such as a perforating gun (716), into the well.

The perforating gun (716) is pumped into the first well (702) using the lubricator (714), wireline (712), and fluid pressure. In accordance with one or more embodiments, the perforating gun (716) is equipped with explosives and a frac plug (718) prior to being deployed in the first well (702). The wireline (712) is connected to a spool (720) often located on a wireline truck (722). Electronics (not pictured) included in the wireline truck (722) are used to control the unspooling/spooling of the wireline (712) and are used to send and receive messages along the wireline (712). The electronics may also be connected, wired or wirelessly, to a monitoring system (724) that is used to monitor and control the various operations being performed by the hydraulic fracturing system (700).

When the perforating gun (716) reaches a predetermined depth, a message is sent along the wireline (712) to set the frac plug (718). After the frac plug (718) is set, another message is sent through the wireline (712) to detonate the explosives, as shown in FIG. 7. The explosives create perforations in the wellbore casing (726) and in the surrounding formation. There may be more than one set of explosives on a singular perforation gun (716), each detonated by a distinct message. Multiple sets of explosives are used to perforate different depths along the casing (726) for a singular stage. Further, the frac plug (718) may be set separately from the perforation operation without departing from the scope of the disclosure herein.

As explained above, FIG. 7 shows the second well (704) undergoing the pumping operation after the fourth stage perforating operation has already been performed and perforations are left behind in the casing (726) and the surrounding formation. A pumping operation includes pumping a frac fluid (728) into the perforations in order to propagate the perforations and create fractures (742) in the surrounding formation. The frac fluid (728) often comprises a certain percentage of water, proppant, and chemicals.

FIG. 7 shows chemical storage containers (730), water storage containers (732), and proppant storage containers (734) that are constituents of the hydraulic fracturing system (700). Frac lines (736) and transport belts (not pictured) transport the chemicals, proppant, and water from the storage containers (730, 732, 734) into a frac blender (738). A plurality of sensors (not pictured) is located throughout this equipment to send signals to the monitoring system (724). The monitoring system (724) may be used to control the volume of water, chemicals, and proppant used in the pumping operation.

The frac blender (738) blends the water, chemicals, and proppant to become the frac fluid (728). The frac fluid (728) is transported to one or more frac pumps, often pump trucks (740), to be pumped through the second frac tree (708) into the second well (704). Each pump truck (740) includes a pump designed to pump the frac fluid (728) at a certain pressure. More than one pump truck (740) may be used at a time to increase the pressure of the frac fluid (728) being pumped into the second well (704). The frac fluid (728) is transported from the pump truck (740) to the second frac tree (708) using a plurality of frac lines (736).

The fluid pressure propagates and creates the fractures (742) while the proppant props open the fractures (742) once the pressure is released. Different chemicals may be used to lower friction pressure, prevent corrosion, etc. The pumping operation may be designed to last a certain length of time to ensure the fractures (742) have propagated enough. Further, the frac fluid (728) may have different make ups throughout the pumping operation to optimize the pumping operation without departing from the scope of the disclosure herein.

When the hydraulic fracturing operation is completed on a well, the frac tree (708) must be removed from the well in order to perform the final completion operations which include drilling out the plugs (718) using coiled tubing or a snubbing unit and installing production tubing (not pictured). The production tubing is installed by running the length of production tubing into the well and landing out the tubing hanger (i.e., the surface extending portion of the production tubing that has seals) into a tubing head that caps the well.

Figure 8:
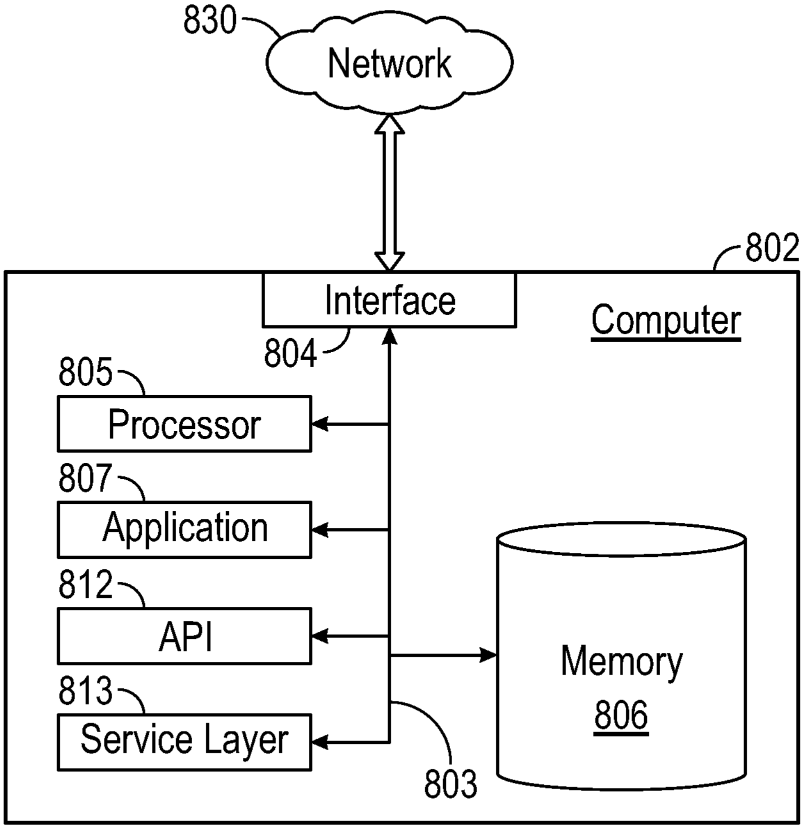
FIG. 8 shows a computer system in accordance with one or more embodiments.

FIG. 8 shows a computer system in accordance with one or more embodiments. The computer system is used to provide computational functionalities associated with described algorithms, methods, functions, processes, flows, and procedures as described in the present disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a graphical user interface (GUI).

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application, for example, executing on another computer (802) and responding to the received requests by processing the said requests in an appropriate software application. Each computer (802) system may receive requests over a network (830) from any other computer (802) and respond to the received requests appropriately. In addition, requests may also be sent to the computer (802) from internal users (for example, from a command console or by other appropriate access method), external or third-parties, other automated applications, as well as any other appropriate entities, individuals, systems, or computers.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) also includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) further includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) or a combination of the API (812) and service layer (813). The API (812) may include specifications for routines, data structures, and object classes. The API (812) may be either computer-language independent or dependent and refer to a complete interface, a single function, or even a set of APIs.

The service layer (813) provides software services to the computer (802) or other components (whether illustrated or not) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

There may be any number of computers (802) associated with, or external to, a computer system containing computer (802), wherein each computer (802) communicates over network (830). In some embodiments, steps 602-612 of FIG. 6 may be conducted using a first computer (802) and one or more first applications (807) while a fracturing operation, such as step 614 of FIG. 6, may be monitored using a second computer (802) (i.e., a monitoring system (724)), using one or more second applications (807).

Further, the terms "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for predicting a predicted breakdown pressure for a wellbore, comprising:

constructing a laboratory-scale wellbore analysis system, wherein constructing the laboratory-scale wellbore analysis system comprises:

drilling a miniature replica wellbore in a rock sample; and connecting a rock parameter measurement apparatus to the miniature replica wellbore;

obtaining a set of correction curves, wherein the set of correction curves describes a relationship between a breakdown pressure measurement of a laboratory-scale wellbore and a breakdown pressure of the wellbore, wherein the relationship is determined using a numerical simulation for a plurality of nominal rock parameters and nominal wellbore parameters, and wherein the numerical simulation comprises numerical solutions to a system of poroelastic equations;

obtaining an approximate breakdown pressure, wherein the approximate breakdown pressure is based, at least in part, on measurements taken using the laboratory-scale wellbore analysis system, wherein the measurements comprise a plurality of observed rock parameters and observed wellbore parameters, and wherein obtaining an approximate breakdown pressure further comprises predicting the approximate breakdown pressure using a breakdown pressure prediction model and the plurality of observed rock parameters and observed wellbore parameters; and determining the predicted breakdown pressure for the wellbore from the approximate breakdown pressure and the set of correction curves, and wherein determining the predicted breakdown pressure for the wellbore further comprises interpolating between points in the set of correction curves;

determining a well construction plan based, at least in part, on the predicted breakdown pressure; and hydraulically fracturing a well guided by the well construction plan.

2. The method of claim 1, wherein the breakdown pressure prediction model comprises a Hubbert-Willis model.

3. The method of claim 1, wherein the set of correction curves comprises a correction curve for each of a plurality of doublets comprising a normalized wellbore length and a normalized injection rise-up time.

4. A system, comprising:

a laboratory-scale wellbore analysis system comprising:

a miniature replica wellbore within a rock sample; and a rock parameter measurement apparatus connected to the miniature replica wellbore, wherein the rock parameter measurement apparatus is configured to measure a plurality of observed rock parameters and observed wellbore parameters of the miniature replica wellbore; and a computer system configured to:

obtain a set of correction curves describing a relationship between a breakdown pressure measurement of a laboratory-scale wellbore and a breakdown pressure of a reservoir-scale wellbore, determine the relationship using a numerical simulation for a plurality of nominal rock parameters and nominal wellbore parameters, wherein the numerical simulation comprises numerical solutions to a system of poroelastic equations;

receive the plurality of observed rock parameters and observed wellbore parameters measurements taken in the miniature replica wellbore;

determine an approximate breakdown pressure based, at least in part, on the plurality of observed rock parameters and observed wellbore parameters measurements taken in the miniature replica wellbore, wherein determining the approximate breakdown pressure further comprises using a breakdown pressure prediction model and the plurality of observed rock parameters and observed wellbore parameters; and determine a predicted breakdown pressure for the reservoir-scale wellbore from the approximate breakdown pressure and the set of correction curves, and wherein determining the predicted breakdown pressure further comprises interpolating between points in the set of correction curves;

determine a well construction plan based, at least in part, on the predicted breakdown pressure; and a hydraulic fracturing system configured to hydraulically fracture a well guided by the well construction plan.

5. The system of claim 4, wherein the breakdown pressure prediction model comprises a Hubbert-Willis model.

6. The system of claim 4, wherein the set of correction curves comprises a correction curve for each of a plurality of doublets comprising a normalized wellbore length and a normalized injection rise-up time.

7. The system of claim 4, wherein the laboratory-scale wellbore analysis system is configured to raise a fluid pressure within the miniature replica wellbore while constraining applying stresses along at least one axis of the rock sample.

* * * * *